June 24, 1969   W. P. SAYLOR, JR., ET AL   3,452,197
BIOLOGICAL EQUIVALENT RESPONSIVE NEUTRON SURVEY METER
Filed Feb. 24, 1965                                Sheet 1 of 2

INVENTORS.
WILLIAM P. SAYLOR, JR.
HERMAN M. CHILDERS
BY
ATTORNEY.

United States Patent Office 3,452,197
Patented June 24, 1969

3,452,197
BIOLOGICAL EQUIVALENT RESPONSIVE NEUTRON SURVEY METER
William P. Saylor, Jr., and Herman M. Childers, Alexandria, Va., assignors to American Machine & Foundry Company, a corporation of New Jersey
Filed Feb. 24, 1965, Ser. No. 434,785
Int. Cl. G01t 3/00; H01j 39/32
U.S. Cl. 250—71.5                                   7 Claims

ABSTRACT OF THE DISCLOSURE

The present invention comprises a device for detecting and measuring neutron radiation in terms of relative biological effectiveness and includes a probe having a neutron sensor which is a unitary element made up of a plurality of laminae of a synthetic hydrogen-containing transparent plastic, the interfaces of said laminae being separated by a layer of charged particle detecting material combined with a lithium-6 compound.

---

This invention relates to radiation meters and more particularly to a neutron dose rate meter having the capability of responding in a biologically equivalent manner to the dose rates of neutrons ranging in energies from about 0.025 electron volt to about 15 million electron volts (15 mev.).

It is known by those skilled in the art concerned with biological effects of radiation that there is a maximum permissible amount of exposure to radiation which individuals may tolerate with minimal risks in a given period of time. Federal and state regulations exist which specify these maximum permissible exposures. Exposures in excess of this amount are dangerous. It is essential, therefore, both to preclude excessive exposure and to know if exposure to excessive doses is occurring so that timely remedial action may be taken. In this connection, accordingly, various instruments to measure radiation have been devised and are presently available. The present invention is directed to an improved instrument capable of detecting neutron radiation, measuring neutron dose rates, and discriminating neutrons from other radiations.

The invention provides a distinct improvement in instruments of this kind, a number of which have been reported in the technical literature, and some of which are marketed commercially. The prior devices either do not have a response to different energy neutrons that is similar to relative biological effectiveness, or they have the disadvantages of being rather complex electronically and/or rather heavy (weight of perhaps 25 pounds). Such features render those units undesirable for a hand-portable survey meter for use in routine monitoring of neutron radiation hazards.

Since neutrons have no effective electronic charge, nearly all neutron detection techniques involve an intermediate reaction whereby energy is imparted to a charged particle which in turn can be detected by a variety of methods. In the detector of the present invention, the charged particles generated by the novel probe are detected by a suitable scintillation material. A variety of scintillation compounds are known, including inorganic materials, e.g., ZnS(Ag), as well as organic substances, e.g., anthracene.

The charged particles for the detection are generated by the elastic and inelastic collision of the neutrons with hydrogen nuclei (protons) of a hydrogenous transparent plastic from which the layers or sheets comprising the probe body are formed. Suitable plastics having appropriate molecular hydrogen and good optical clarity include in addition to the preferred compounds polymethylmethacrylate and polymers of styrene which include (non-substituted) styrene itself, methyl- and ethyl-styrene, compounds such as ethyl acrylate; butyl acrylate; vinyl chloride; vinyl acetate; polyolefinic copolymers, e.g., ethylene-propylene copolymers; polyphenyleneoxide; polyethylene terephthalate; polyesters; epoxides; and the like.

In addition to the charged particles generated by the plastic laminate, the primary source of charged particles is from neutron-induced transmutation in a lithium-6 material deposited at the interfaces between the sheets of the transparent plastic laminate. The bonding composition comprises a compound containing a lithium-6 isotope, e.g., lithium fluoride, iodide or other salt of the atomic species of lithium-6 coated on the interface surfaces of the plastic sheets of the laminate. While the interfacial material between the plastic layers preferably comprises a lithium-6 material (to generate the charged particles) in combination with a different scintillant (to convert the charged particle energy to light), it will be noted that these functions may be combined in a single material capable of providing both effects, of charged particle generation and scintillant, e.g., [Li$_6$I(Eu)], lithium-6 iodide activated with europium available from Harshaw Chemical Company. Additionally this dual function may be effected by use of available plastic scintillants, e.g., modified polystyrene. A particularly advantageous combination comprises layers of polymethylmethacrylate plastic with thin interlaminar layers of lithium-6 fluoride as the mechanism for generating the charged particles coupled with a thin interlaminar layer of [ZnS(Ag)], zinc sulfide activated with silver as the scintillant which converts the energy of these particles into measurable light. In addition to lithium-6 fluoride, other lithium-6 compounds which are chemically compatible with the materials forming the probe may be used, e.g., lithium-6 phosphate or lithium-6 carbonate. The charged particles thus generated by the lithium-6 and hydrogen in the plastic laminate are absorbed by a scintillant which is also applied at the interface of the plastic laminates. In addition to zinc sulfide, various known scintillants may be utilized. These light emitting materials may be referred to interchangeably as lumiphors, phosphors or scintillants.

In general, the special features of the detector of the invention in addition to the component parts described above, entail the dimensioning and arrangement of the types, amounts, and locations, of neutron reaction materials and scintillation materials at interfaces of transparent hydrogenous plastic sheets whch are bonded together and processed to form the neutron sensing element or detector.

It is an object of the present invention to provide a scintillation type detector with a sensitivity to neutrons with energy from 0.025 electron volt to 15 mev.

It is a further object of the invention to provide a neutron dose rate meter having good discrimination against sensitivity to X-ray, beta, or gamma radiation.

It is another object of the invention to provide a device of this kind which has a sensitivity that is not dependent on relative angle between the axis of the detector and direction of incident neutron radiation.

It is a further object of the invention to provide a neutron dose rate meter which is capable of giving a readout which is a direct indication of the radiological hazard of the neutrons being monitored.

It is a further objective of the invention to provide a light weight, inexpensive, compact, hand-portable, battery-operated instrument which detects and measures the neutron radiation.

Still another object of the invention is to provide a sensing instrument, which utilizes both proton recoils and reaction charged particles to attain sensitivity and in which the light transmitting element is used also as a source of recoil proton for subsequent detection by the phosphor coated on the element.

Additional objects and advantages will become apparent as the description of the invention progresses and when considered in conjunction with the accompanying drawing, wherein.

Figure 1:
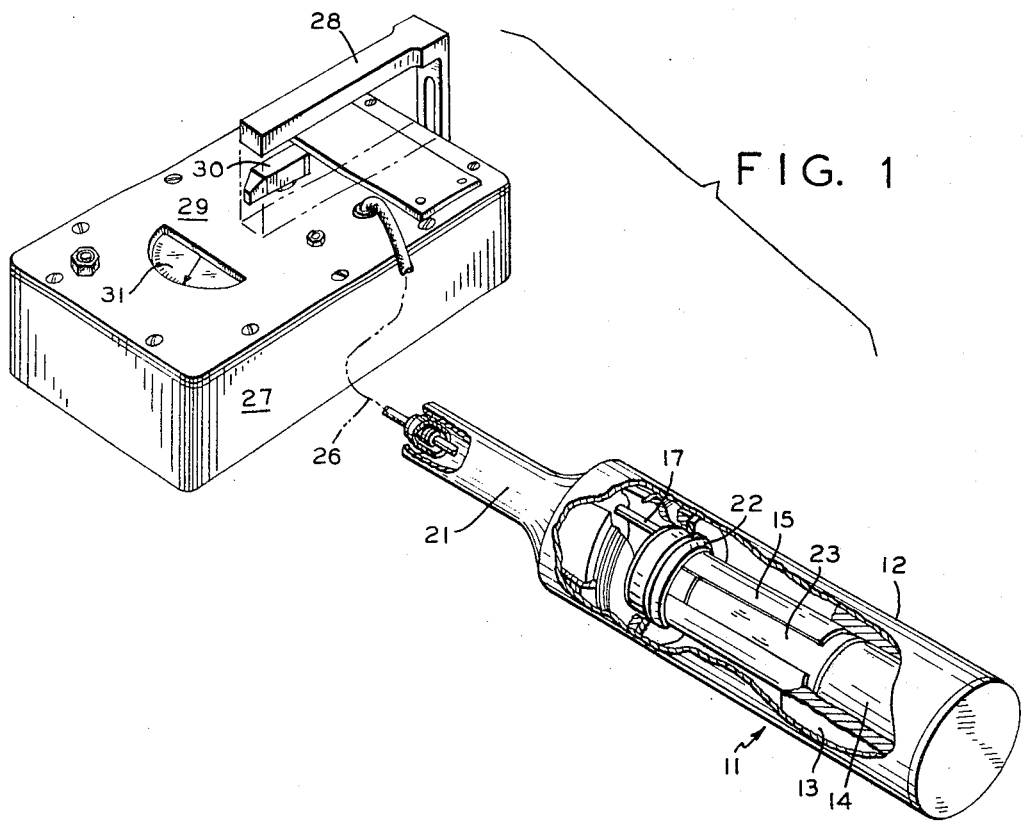
FIG. 1 is a perspective view of the neutron survey meter detector probe and meter assembly connected by cable with parts of the detector probe broken away.

Briefly stated, the invention contemplates the provision of a neutron survey meter whose features relate principally to the combination of a scintillating detector (neutron sensing element) and includes as an advantageous feature, a shield which surrounds the detector. This combination of detector and shield provides an overall sensitivity to neutrons as a function of neutron energy that closely approximates the neutron energy dependence of chronic biological hazard of exposure to neutrons. This dependence is described in the National Bureau of Standards Handbook 63 and is referred to as RBE (Relative Biological Effectiveness) factors. Stated alternately, the neutron energy dependent response of the instrument, in count rate per unit neutron flux, closely approximates the neutron energy dependent biological hazard dose rate (mrem./hr.) per unit neutron flux.

Referring more specifically to the drawings, a probe head 11 is connected by means of a coaxial cable 26 to a meter carrying case 27 which is carried by a handle 28 secured to cover 29. The cover 29 which carries a microammeter 31 which has a scale with an appropriate reading. The actual dose rate scale depends on the position of a multiplier indicated by a selector switch handle 30 which is also supported on the cover 29 which closes the top of the case forming the body of the meter case or container 27. The probe 11 comprises any suitable configuration and is shown as an elongated bottle shape for convenience of handling. Probe 11 includes a cylindrical body 12 and a neck portion 21 which functions as a handle for the operator and through which the coaxial cable 26 is connected. Elements of the probe include a detector element 14, contained within a neutron shield 13, a photomultiplier tube 23 and a magnetic shield 15 thereover. The tube 23 is appropriately mounted within the housing 12 so as to "float," i.e., be insulated, thereby cushioning it against mechanical shock. Spacer elements 17 exist between printed circuit boards A which electrically connect the socket 22 of the tube to the conventional back plate socket 24 in the neck 21 of the probe 11. The photomultiplier tube 23, socket 22, and printed circuit boards A are enclosed in a jacket of cadmium sheet B which extends into the neck portion 21 of the probe 11. As such these components are conventional and are not of the essence of the present invention.

Figure 2:
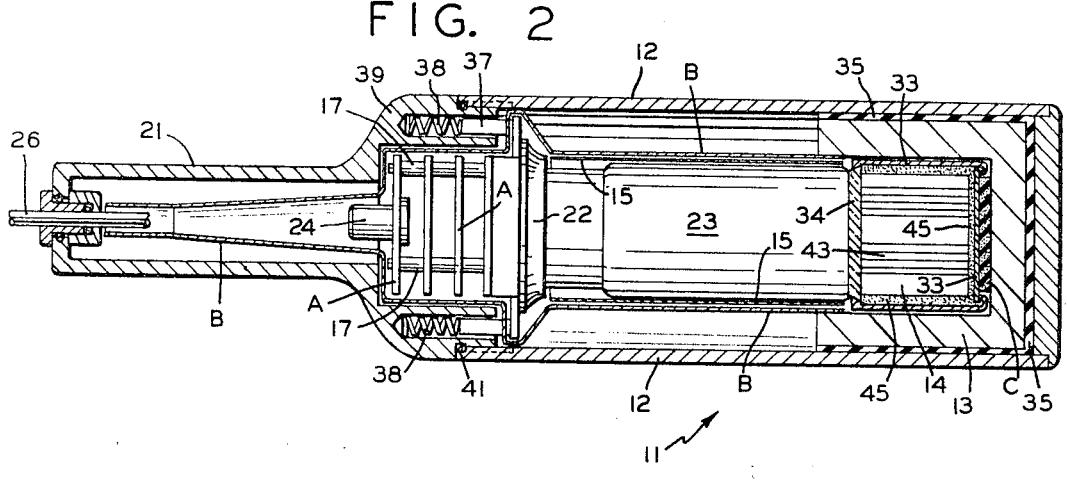
FIG. 2 is a longitudinal vertical section of the detector probe.

The details of the scintillation type detector of the invention are shown more clearly in FIG. 2 which illustrates the sensing element 14 contained within a hermetic barrier 33 preferably formed of metal on three sides and separated from the photomultiplier tube 23 by a cover 34 which permits the transmission of light therethrough. The neutron shield 13 encloses the element 14 and is secured to the cylindrical housing 12 by a suitable cushioning material 35 such as silicone rubber adhesive.

The element 14 is cushioned from the shield 13 and held tight against the photomultiplier tube 23 with the aid of a pad or disc of suitable cushioning material, e.g., soft sponge rubber C, which is attached to the end of the hermetic enclosure 33.

The entire photomultiplier system is mounted on a floating suspension 37 provided by compression springs 38 seating against the probe housing bottom 39. The probe housing top 12 is screwed to the probe housing bottom 39 and suitably sealed as by use of an O-ring 41.

Figure 3:
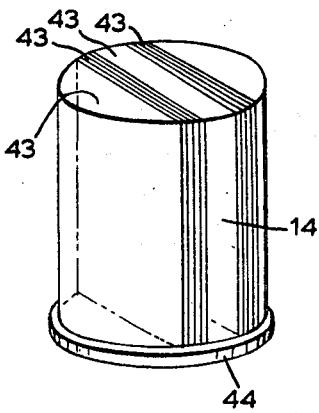
FIG. 3 is a perspective view to illustrate the laminated detector element.

The novel detector 14 of this invention shown in detail in FIG. 3 is fabricated in accordance with the following illustrative example. The specific enumeration of details therein should not be interpreted as a limitation except as expressed in the appended claims.

EXAMPLE

Polymethylmethacrylate (PMMA) sheets 43 of which FIG. 3 illustrates one assemblage, comprise the sensing element 14. The PMMA sheets are cut to dimensions of 1½" x 2" and coated on both sides with zinc sulfide ZnS(Ag) scintillant of a thickness of about 10 milligrams per square centimeter. The coated plates are then systematically stacked as a laminate comprised of a plurality of PMMA sheets having applied thereon (e.g., as by spraying) a thin uniform coat of lithium fluoride ($Li^6F$) which upon assembly is sandwiched between the sheets. This laminate stacking and $Li^6F$ deposition operation is performed so as to afford a substantially uniform deposition of about 60 milligrams of $Li^6F$ per interface. Although the exact number and thickness of the plastic plates, their order in stacking and the thickness of the lithium-6 compound and scintillant coating may permit some variation, the interrelationship between elements is important if the desired response for different energy neutrons is to be achieved. In this example, eight plates 1/16" thick and three plates 3/8" thick per detector are stacked. The resulting 1½" x 1½" x 2" stacked assembly is then inserted in a mold of the same dimensions and heated to a temperature at which the PMMA softens. Then, several hundred pounds of pressure are applied to the stack to bond the plates together.

With the pressure still applied, the mold and detector are permitted to cool to about 140° F. At this point, the mold is disassembled and the detector block is ejected and a ¼" thick PMMA block is then bonded onto each of the 1½" x 1½" ends of the detector block to maintain the unit integrally sound during machining. These ¼" blocks provide mechanical strength for the machining operation that follows. Prior to mounting the detector block in a lathe, the block is readied in the form roughly of a cylindrical block as by belt sanding the corners. The block is then turned down to the proper diameter of 1⅜"; then one-half inch of one of the ends is milled off. The new surface is polished and a ⅛" thick disc shown as 44 in FIG. 3 is bonded to the surface with Lucite solvent, care being taken to obtain good optical coupling. The opposite end is then milled off, extreme care being taken to avoid excess pressure in the chuck which might strain the detector and cause loosening at the interfaces between the Lucite plates. The cylindrical surface and the end opposite the plastic disc are then buffed to a satin finish and the detector is then hermetically sealed in a thin aluminum can 33 after applying a light-reflecting powder 45, e.g., magnesium oxide, between the can wall and the detector.

The element 14 so composed of doping material interspersed between layers of plastic and housed in the barrier 33, produces scintillations resulting from neutron interactions with it. The scintillations are piped through the PMMA into the photomultiplier tube 23 which converts the light pulse to an amplified voltage pulse. The voltage pulse is amplified by a preamplifier and conducted through the probe cable 26 to be again amplified in the radiacmeter. Pulses greater than a given amplitude are selected by the discriminator circuit, conducted to the meter circuit, and converted to a current. The output current is displayed on the ammeter which has been calibrated directly in mrem./hr.

Figure 5:
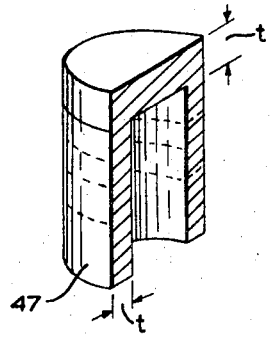
FIG. 5 is a perspective view in section showing the shield element within which the detector element is housed.
Figure 4:
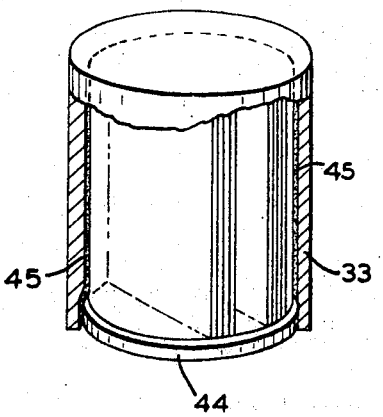
FIG. 4 is a view of the detector of FIG. 3 which has been enclosed in a hermetically sealed metallic container as is shown partially in section.

Various formulations may be employed in fabricating the shield (47) illustrated in FIG. 5. A preferred formulation and procedure which may be employed is the following:

A heavy paste-consistency composite mixture of boron of isotope weight 10, manganese, titanium and polymethylmethacrylate in solvent is introduced into a mold and bonded under relatively high pressure at about 350° F. Care must be taken to allow the mold to "breathe" since trapped gases in the material can cause small "explosions," i.e., gassing-out, during disassembly of the mold. This problem may be avoided by successive heating, pressing, then releasing mold pressure to permit outgassing as the ultimate pressure and temperature are approached. Both the sleeve and the disc which make up the cup shaped shield have a wall thickness $t$ of about one centimeter. The two pieces are bonded together under slight pressure using PMMA in solvent as adhesive.

Figure 6:
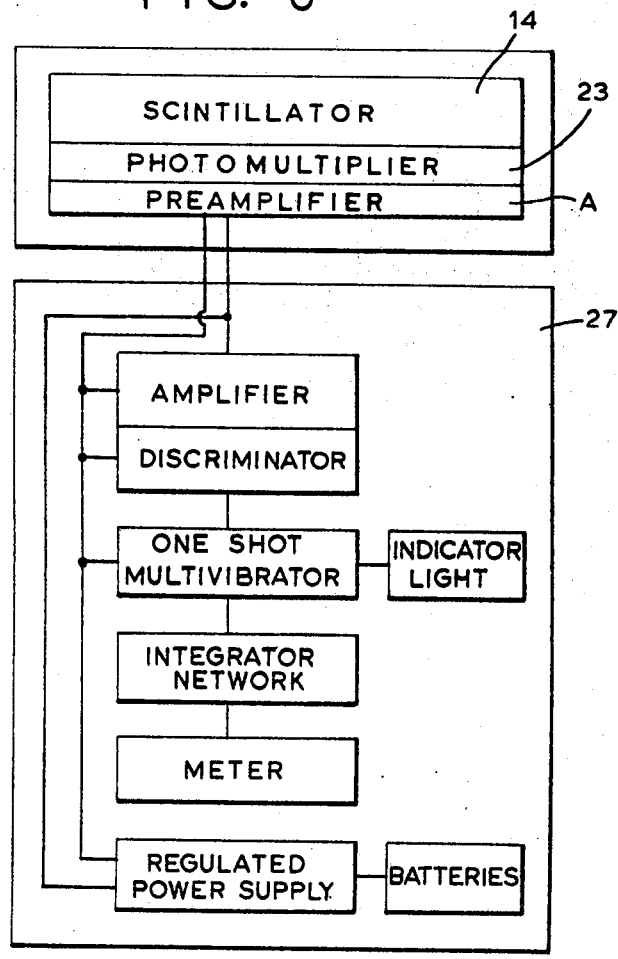
FIG. 6 illustrates, diagrammatically, a system in conjunction with which the novel sensor of the invention may be used.

The assembly and circuitry of the unit will be further apparent by reference to the block diagram of FIG. 6. As shown, the circuitry in the carrying case 27 acts as a single channel pulse height discriminator with both a rate meter output and an individual indication of each plate. Light pulses generated in the scintillator produce electrical pulses in the photomultiplier which are amplified and then sorted by the discriminator. Each pulse large enough to trigger the discriminator produces an output from the one shot multivibrator. Output pulses from the multivibrator are averaged to provide a current through the meter proportional to the count rate and are also used to trigger the indicator light.

Power is obtained from three 1½ volt D size dry-cell batteries and is converted to high voltages by a blocking oscillator and associated voltage multiplier circuits. Power for the meter illumination is obtained directly from the medium voltage output of the oscillator transformer. DC voltages of plus 8.5, plus 120, and plus 1000 volts are produced for the amplifier supply, counts light supply and photomultiplier supply, respectively. The output is regulated by controlling oscillator current from the 8.5 volt output.

A dual shielded cable connects the probe assembly to the radiacmeter assembly. Both voltage and photomultiplier signals are carried by this cable with decouplers used to isolate the signal from the high voltage supply and the bleeder string in the photomultiplier.

Two NPN–PNP pairs and a silicon tunnel diode are used in the amplifier-discriminator circuit. Each pair is arranged as a feedback amplifier with the tunnel diode in the emitter circuit of the last transistor. Sensitivity is controlled by varying the amount of feedback in the first amplifier pair. Switching of the tunnel diode provides the output signal and simultaneously reduces the feedback of the second pair, providing a re-generative action which ensures triggering of the multivibrator.

It will be understood that the invention in a preferred embodiment only has been shown and described herein. However, it is contemplated that various changes and modifications may be made based on the foregoing teaching and within the scope of the annexed claims without departing from the invention.

We claim:
1. In a portable neutron dosimeter for detecting and measuring neutron radiation including in combination, a probe, photoelectric converter, power supply, amplifier and readout meter, the improvement comprising a probe capable of measuring dose rates in terms of relative biological effectiveness, said probe including a neutron sensor, said sensor comprising a bonded unitary element, said element comprising a plurality of laminae of a synthetic hydrogenous transparent plastic and having at the interface of said laminae a separating layer of charged particle detecting material in combination with a lithium-6 compound, the integral structure being hermetically sealed in a metallic container and said container provided with a window transparent to the light of scintillations resulting from neutron radiation interacting in the integral structure.

2. The improvement of claim 1 wherein the lithium compound is lithium chloride.

3. The improvement of claim 1 wherein the hydrogenous plastic is polymethylmethacrylate.

4. The improvement of claim 1 wherein the charged particle detecting material is zinc sulfide.

5. The dosimeter of claim 1 further characterized by hermetically sealing said integral structure in a metallic container and wherein said container is provided with a window transparent to the light of scintillations resulting from neutron radiation interacting in said integral structure.

6. The dosimeter of claim 1 further characterized in that hermetically sealed sensor is enclosed within a shield comprising an intimate mixture of boron of isotope number 10, manganese, titanium and polymethylmethacrylate.

7. In a portable neutron dosimeter for detecting and measuring neutron radiation including in combination a probe, photoelectric converter, power supply, amplifier and readout meter, the improvement comprising a probe capable of measuring dose rates in terms of relative biological effectiveness, said probe including a neutron sensor, said sensor comprising a unitary element formed of a plurality of laminae of polymethylmethacrylate said polymethylmethacrylate laminae coated with separating layers of zinc sulfide and lithium fluoride and bonded into an integral structure, the integral structure being hermetically sealed in a metallic container and said container provided with a window transparent to the light of scintillations resulting from neutron radiation interacting in the integral structure.

References Cited

UNITED STATES PATENTS

| 2,596,080 | 5/1952 | Raper et al. | 250—83.6 |
| 2,608,661 | 8/1952 | Zinn. | |
| 2,799,780 | 7/1957 | Ruderman | 250—71.5 |
| 2,910,592 | 10/1959 | Armistead. | |
| 2,968,726 | 7/1961 | Bersin et al. | 250—83.1 |
| 2,991,363 | 7/1961 | Rosenthal. | |
| 3,088,030 | 4/1963 | Rickard. | |
| 3,122,635 | 2/1964 | Ludlum. | |
| 3,141,092 | 7/1964 | Weinberg | 250—83.1 X |
| 3,288,996 | 11/1966 | Monaghan | 250—71.5 |

RALPH G. NILSON, *Primary Examiner.*

SAUL ELBAUM, *Assistant Examiner.*

U.S. Cl. X.R.

250—83.1